United States Patent [19]

Bogus et al.

[11] 3,888,697

[45] June 10, 1975

[54] PHOTOCELL

[75] Inventors: Klaus Bogus, Horkheim; Siegfried Mattes, Heilbronn-Bockingen, both of Germany

[73] Assignee: Licentia-Patent-Verwaltungs-G.m.b.H., Frankfurt am Main, Germany

[22] Filed: Oct. 16, 1972

[21] Appl. No.: 297,703

[30] Foreign Application Priority Data

Oct. 23, 1971 Germany ............................ 2152895
Oct. 23, 1971 Germany ............................ 7140208

[52] U.S. Cl. ....................... 136/89; 136/89; 313/94; 357/30; 427/74; 204/38 R

[51] Int. Cl. .......................... B44d 1/18; H01l 15/02

[58] Field of Search ................ 117/217, 62; 136/89; 204/38 R, 37 R; 313/94; 250/200

[56] References Cited

UNITED STATES PATENTS

| | | | |
|---|---|---|---|
| 2,820,841 | 1/1958 | Carlson et al. | 136/89 |
| 3,373,059 | 3/1968 | Augustine | 136/89 |
| 3,520,732 | 7/1970 | Nakayama et al. | 136/89 |

*Primary Examiner*—Cameron K. Weiffenbach
*Attorney, Agent, or Firm*—Spencer & Kaye

[57] ABSTRACT

A thin layer photocell comprises a semiconductor body of cadmium sulphide with a layer of cuprous sulphide thereon and then an additional layer containing metallic on the cuprous sulphide layer. A method for making such a photocell is also disclosed.

17 Claims, 4 Drawing Figures

PHOTOCELL

BACKGROUND OF THE INVENTION

The invention relates to a thin-layer photocell of cadmium sulphide with a surface layer of copper sulphide, and to a method for making it.

For the direct conversion of light into electrical current many monocrystalline silicon cells are used, which have a pn-junction. Such cells have an efficiency of at least 11 percent, wherein the useful life of the cells is practically unlimited for terrestial purposes. The disadvantage of these cells consists in that they are relatively expensive to manufacture and the specific weight cannot be reduced at will.

One is therefore constrained to develop photocells which are necessarily substantially cheaper and simpler to manufacture even at the cost of the efficiency. In this direction of development, the polycrystalline thin-layer photocells which, as is well known, have been the most successful, use cadmium sulphide as the n-type semiconductor basic body and are provided on the upper surface with a p-type conductive layer of copper sulphide. Since these photocells comprise a cadmium sulphide layer which is only about 20 to 80 $\mu$m thick, the cells have a low specific weight and are usually flexible. Since the cadmium sulphide layer is evaporated in a polycrystalline manner on to the underlay, large area photocells can be produced cheaply.

In the case of the thin-layer photocells on the CdS basis a conversion efficiency of about 6 percent has hitherto been achieved. The low stability at high temperatures has a disadvantageous effect here.

SUMMARY OF THE INVENTION

It is an object of the invention to provide a thin-layer photocell on the CdS basis which has an increased efficiency and is stable at increased temperatures.

According to one aspect of the invention, there is provided a thin layer photocell comprising a semiconductor body of cadmium sulphide, a layer of cuprous sulphide on said cadmium sulphide body, and an additional layer containing metallic copper arranged on said cuprous sulphide layer.

According to a second aspect of the invention, there is provided a method of producing a thin layer photocell comprising the steps of forming a layer of cuprous sulphide on a semiconductor body of cadmium sulphide and forming an additional layer containing metallic copper on said cuprous sulphide layer.

BRIEF DESCRIPTION OF THE DRAWINGS

The invention will now be described in greater detail, by way of example, with reference to the drawings, in which.

DESCRIPTION OF THE PREFERRED EMBODIMENT

Basically the invention proposes that, on the cuprous sulphide layer, there is arranged a further layer containing copper which is thin as compared to the cuprous sulphide layer.

Obviously the stoichiometric composition of the cuprous sulphide layer is substantially improved by the measures in accordance with the invention. The upper surface layer containing copper preferably comprises, in an advantageous further development of the arrangement in accordance with the invention, metallic copper. With the help of the measures described an improvement in the photoelectric efficiency in particularly achieved, if the copper sulphide layer comprises an upper surface region of the cadmium sulphide which has been converted by a chemical reaction.

Figure 1:
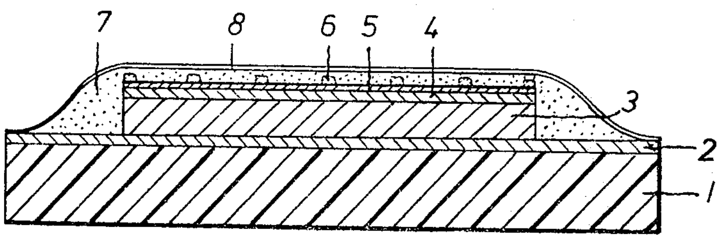
FIG. 1 is a sectional view of one form of photocell in accordance with the invention.

Referring now to the drawings, FIG. 1 shows a section of a finished CdS–$Cu_2S$–Cu thin-layer photocell. The support body 1 is comprised, for example, of plastics and is coated on the upper surface side provided for the accommodation of the semiconductor body with a layer 2 of siliver or another metal of good conductivity. On to the plastic support body 1 is evaporated a cadmium sulphide layer 3 which is about 20 to 80 $\mu$m thick. This cadmium sulphide layer 3 is of the n-type conductivity and has for example a specific resistance in the region between 1 and 100 ohm cm. A copper sulphide layer is to be produced on the free upper surface of the CdS layer and this layer is for example 500 to 2000 A thick. This is effected in an advantageous manner in that the cadmium sulphide is dipped after a prior surface cleaning, into a solution containing positive copper ions. Such a solution comprises for example copper chloride, ammonium chloride and a reducing agent. In this solution, which, for example, is warmed to a temperature of 90°C, the CdS layer is transformed on the surface into copper sulphide. The stoichiometric composition of this copper sulphide layer is decisive for the photo-electric efficiency of the cell. In this case efforts are made that the copper sulphide layer comprises, as far as possible, large regions of $Cu_2S$ and the other possible copper-sulphur compounds are extensively suppressed. The copper sulphide layer is given the reference numeral 4 in FIG. 1.

Now in the further course of the manufacturing process, the photocell can be subjected first to a tempering by which a photoelectric efficiency corresponding to the current prior art in the order of magnitude of 5 to 6 percent is achieved. The temperature necessary in this treatment and the duration of its effect on the photocell is dependent on the stoichiometry and the structure of the copper sulphide layer. The photocells are for example tempered at a temperature of approximately 200°C for 10 minutes.

However, this intermediate tempering can also be given up when carrying out the manufacturing method in accordance with the invention. A further upper surface layer 5 containing copper is applied to the copper sulphide layer. This layer consists preferably of metallic copper with a thickness of approximately 20 to 30 A. The thicker this layer is, the longer the semiconductor arrangement must be tempered in a subsequent process step so that an optimal efficiency of the cell is set up. The necessary tempering time can be easily determined by experiment. It has been shown that, with a copper layer thickness of approximately 20 to 30 A, photocells with good electrical properties can be produced, wherein the optimal photo-electric efficiency is set up after tempering of about 15 minutes duration at approximately 200°C. The tempering is effected for example in air or in vacuo. The efficiency could be increased for example from 5.5 to 7.3 percent in an arrangement produced in accordance with the invention. The reason herefor should be sought in the improvement of the stoichiometric composition of the copper sulphide layer.

The additional layer 5 containing copper can be evaporated on to the copper sulphide upper surface in vacuo or deposited chemically or electrolytically. Furthermore a layer enriched with copper can be produced on the copper sulphide layer in that the arrangement is tempered in a reducing atmosphere. This is effected for example by treating the copper sulphide layer in a discharge field in an atmosphere of hydrogen.

To finish the photocell a contact grating or grid-like electrode 6, which comprises, for example, gold, is applied to the upper surface layer 5 containing copper and is glued thereto with the help of a suitable adhesive. After that, a transparent foil 8 coated with a transparent adhesive 7 is laid on the semiconductor arrangement and pressed together with this. This pressing process preferably takes place at a temperature at which the adhesive becomes plastic so that on cooling and hardening of the adhesive, the semiconductor body, metal electrode and foil stick together firmly and intimately. The transparent and glued-on foil 8 is preferably stuck with its edge to the upper surface of the support body 1 so that the thin-layer photocell is protected on all sides against outer influences.

Figure 2:
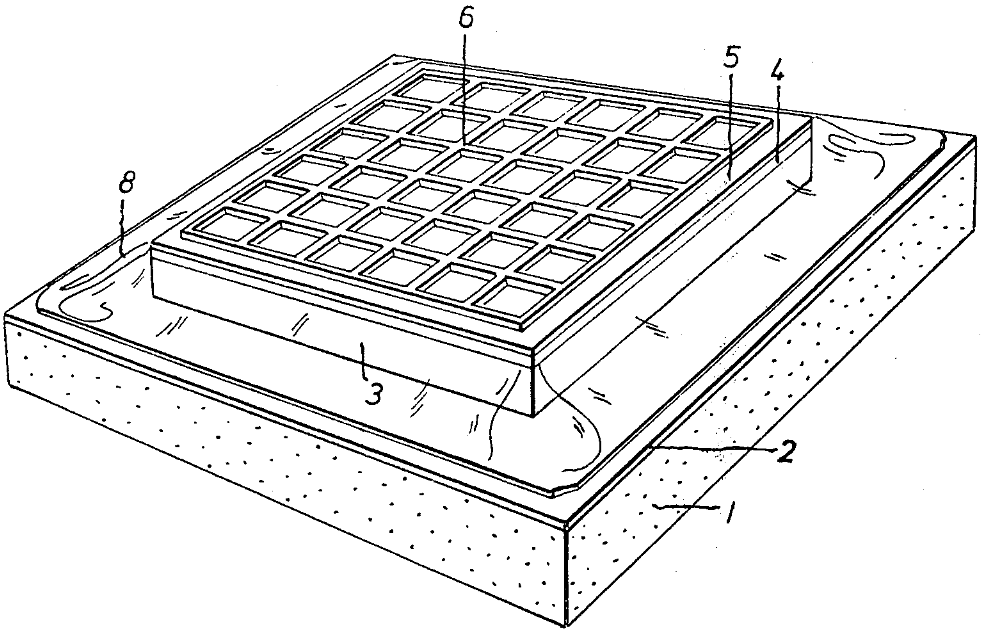
FIG. 2 is a perspective view of the photocell shown in FIG. 1.

FIG. 2 shows the arrangement, shown in section in FIG. 1 shown in perspective for the sake of clarity.

Figure 3:
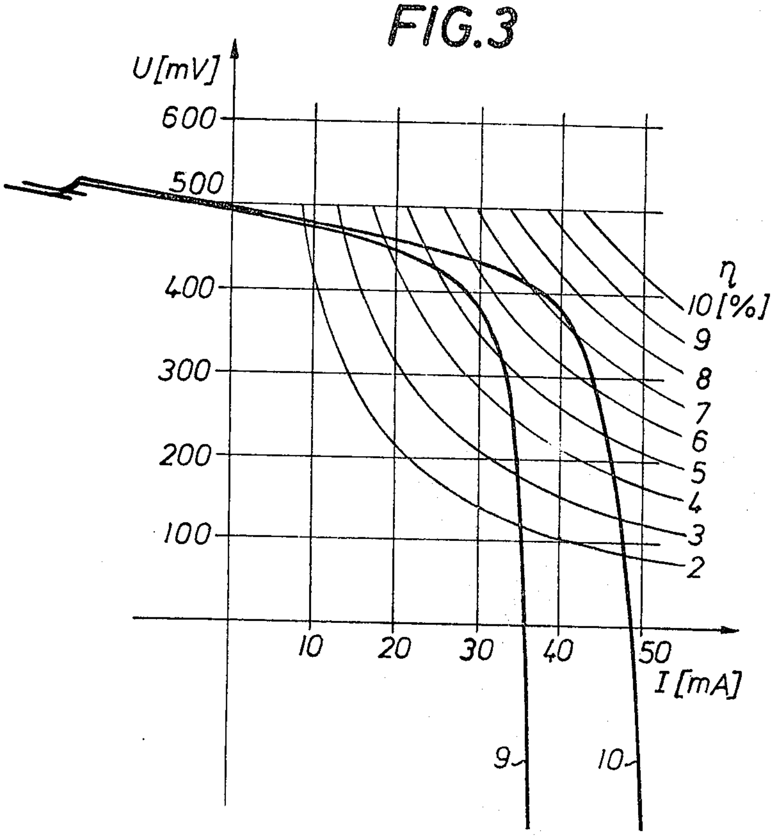
FIG. 3 is a graph of voltage against current of two photocells for comparison.

The result of a comparison experiment can be derived from the diagram of FIG. 3. Nine indicates the U-I-characteristics of the CdS photocell which was manufactured according to the known method and thus without an upper surface layer containing additional copper. 10 is the curve of a photocell in accordance with the invention. The active surfaces of both cells were 1.5 $cm^2$. The photocells were irradiated with light under simulated space conditions. As can be seen from the curves, both cells have approximately the same idling voltage of 500 mV. On the other hand, the short-circuit current in the cell in accordance with the invention increases substantially with respect to the earlier usual cells. Instead of 35 mA it now amounts to approximately 50 mA. As further follows from the efficiency lines drawn in in the diagram, the maximum efficiency in the optimal working point can be increased from 5.5 to 7.3 percent.

Figure 4:
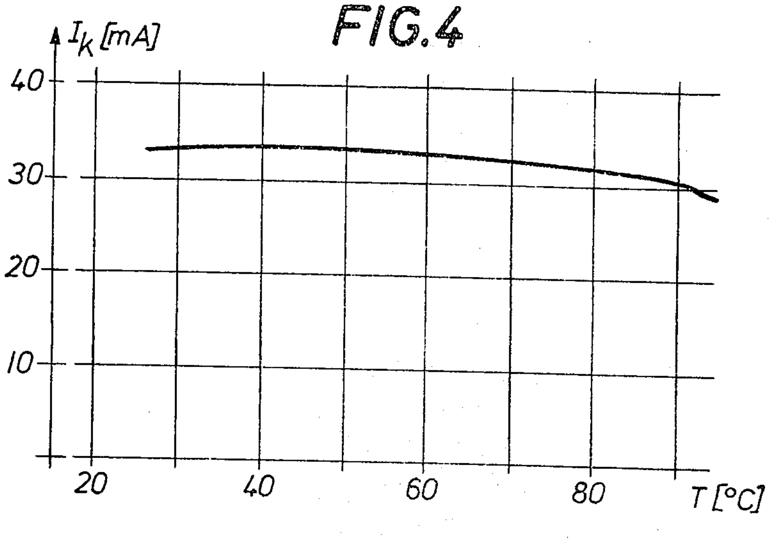
FIG. 4 is a graph of short circuit current against temperature of a photocell in accordance with the invention.

It follows from the diagram in FIG. 4 that the short-circuit current also decreases only slightly even with increasing temperature. Whereas the known cells are stable only up to about 70°C, the cells in accordance with the invention remain stable to over 100°C and show only a slight reversible decrease in the short-circuit current. From this it follows that the photocells can be used also in space conditions to convert solar energy into electrical energy, since the useful life is considerably increased and the time degradation of the cell is greatly reduced.

It will be understood that the above description of the present invention is susceptible to various modifications, changes, and adaptations.

What is claimed is:

1. A thin layer photocell comprising a semiconductor body of cadmium sulphide, a layer of cuprous sulphide on said cadmium sulphide body, and an additional layer of metallic copper arranged on said cuprous sulphide layer, said additional layer of copper being thin in relation to said cuprous sulphide layer.

2. A photocell as defined in claim 1, wherein said cuprous sulphide layer has a thickness of approximately 500 to 2000 A, whereas said additional layer of copper is approximately 20 to 30 A thick.

3. A photocell as defined in claim 1 further comprising a conductive electrode contacting said semiconductor body and a conductive grid-like electrode overlying and contacting said additional layer.

4. A method of producing a thin layer photocell comprising the steps of forming a layer of cuprous sulphide on the surface of a semiconductor body of cadmium sulphide and forming an additional layer of copper, which additional layer is thin in relation to said cuprous sulphide layer, on said cuprous sulphide layer.

5. A method as defined in claim 4, and comprising evaporating said additional layer, of copper on to said cuprous sulphide layer of said photocell in vacuo.

6. A method as defined in claim 4, and comprising depositing said additional layer of copper on said copper sulphide layer of the photocell chemically.

7. A method as defined in claim 4, and comprising depositing said additional layer of copper on said cuprous sulphide layer of the photocell electrolytically.

8. A method as defined in claim 4 wherein said method further includes contacting said semiconductor body with a first conductive electrode and contacting said additional layer with a grid-like conductive electrode which overlies said additional layer.

9. A method as defined in claim 4, and comprising producing said additional layer of copper by reduction of the cuprous sulphide layer.

10. A method as defined in claim 9, and comprising reducing said cuprous sulphide layer on its outer surface by treatment in a discharge field in a hydrogen atmosphere.

11. A method as defined in claim 4, and comprising firstly applying said cadmium sulphide to a metallized plastic underlay and converting said cadmium sulphide on its free outer surface by immersing it into a hot copper ion solution in to said cuprous sulphide layer.

12. A method as defined in claim 11, and comprising applying said additional layer of copper directly after the production of said cuprous sulphide layer.

13. A method as defined in claim 11 and comprising tempering said photo-cell before the application of said additional layer of copper.

14. A method as defined in claim 4, further comprising tempering the photocell after application of said additional layer of copper at a predetermined temperature and for a predetermined time which are sufficient to provide the cell with an optimal photoelectrical efficiency.

15. A method as defined in claim 14, and comprising tempering said photocell in air.

16. A method as defined in claim 14, and comprising tempering said photocell in vacuo.

17. A method as defined in claim 14, and comprising tempering said photocell for approximately 15 minutes at approximately 200°C.

* * * * *